United States Patent [19]

Mikake

[11] Patent Number: 5,328,781
[45] Date of Patent: Jul. 12, 1994

[54] BATTERY STORAGE MECHANISM FOR ELECTRONIC DEVICE

[75] Inventor: Noriyuki Mikake, Nara, Japan

[73] Assignee: Sharp Kabushiki Kaisha, Osaka, Japan

[21] Appl. No.: 141,566

[22] Filed: Oct. 27, 1993

[30] Foreign Application Priority Data

Nov. 2, 1992 [JP] Japan .................... 4-294535

[51] Int. Cl.⁵ ............................ H01M 2/10
[52] U.S. Cl. .......................... 429/97; 429/98; 429/99
[58] Field of Search ............... 429/97, 98, 99, 100, 429/96

[56] References Cited

U.S. PATENT DOCUMENTS

| | | | |
|---|---|---|---|
| 4,731,306 | 3/1988 | Dumbser | 429/98 |
| 4,868,074 | 9/1989 | Omori et al. | 429/98 |
| 5,039,580 | 8/1991 | Mori et al. | 429/97 |
| 5,135,822 | 8/1992 | Okamoto | 429/97 |
| 5,149,604 | 9/1992 | Nakanishi | 429/97 |

FOREIGN PATENT DOCUMENTS 64-19256 1/1989 Japan .
1-104649 7/1989 Japan .

Primary Examiner—Anthony Skapars
Attorney, Agent, or Firm—Nixon & Vanderhye

[57] ABSTRACT

A battery storage mechanism has a plurality of holders for holding batteries. The holders has a plurality of cut sections for assisting a removal of battery. A movable switch plate is installed in the vicinity of the cut sections. The switch plate covers at least one of the cut sections, and uncovers a desired cut section by changing a position where the switch member stops. Each holder has a rib which locks the switch plate when a battery is removed from the holder. When a battery is stored in the holder, the rib comes into contact with the battery and changes the position of the rib to unlock the switch plate. If one of the batteries is removed from battery storage section, the switch plate is locked and prohibits the removal of other batteries. If this battery storage mechanism is used in an electronic device having a memory function, it is possible to prevent data in the memory from being lost by a suspension of power supply.

10 Claims, 10 Drawing Sheets

BATTERY STORAGE MECHANISM FOR ELECTRONIC DEVICE

FIELD OF THE INVENTION

The present invention relates to a battery storage mechanism that is capable of storing a plurality batteries, used mainly in an electronic device having a memory function, such as a pocket-size computer, and has a function to prevent a plurality of batteries from being mistakenly removed from the device at a time.

BACKGROUND OF THE INVENTION

A small-size electronic device having a memory function, such as a pocket-size computers needs a main battery for operating the device, and a memory backup battery for retaining data in a memory when a supply of power is suspended, for example, during replacement of the main battery.

In such an electronic device, if a user mistakenly removes the memory backup battery from the device together with the main battery when replacing the main battery, data stored in a memory such as SRAM (Static Random Access Memory) is lost. To prevent such a trouble, the electronic device needs to have a battery storage mechanism which allows replacing the memory backup battery only when the main battery is stored, and allows replacing the main battery only when the memory backup battery is stored.

For example, a pocket-size computer (model number: PA-X1) produced by Sharp has such a battery storage mechanism. The mechanism is explained below with reference to FIGS. 7 and 8.

This battery storage mechanism has holders 23 and 24 which have a circular cross-section and hold two disk-shaped batteries 21 and 22 when inserted therein. The holders 23 and 24 are disposed adjacent to each other on a chassis 25. The batteries 21 and 22 are held in the holders 23 and 24 by pushing them toward the center of the holders 23 and 24 with pushing means such as a flat spring, not shown.

The chassis 25 has cuts 23a and 24a for assisting the removal of the batteries 21 and 22 from the holders 23 and 24. The cuts 23a and 24a are made on a tangent line touching edges of the holders 23 and 24.

In order to prevent the removal of the battery 21 from the holder 23, a first battery lid 26 is mounted to be movable in a diametrical direction of the holder 23. More specifically, the first battery lid 26 is movable between a removal protect position and a removal permit position. In the removal protect position, part of the holder 23 and the entire cut 23a are covered with the battery lid 26. In the removal permit position, the cut 23a is not covered with the battery lid 26 so that a stick-like jig is inserted into the cut 23a to remove the battery 21 from the holder 23.

In order to prevent the removal of the battery 22 from the holder 24, a second battery lid 27 having a structure similar to that of the first battery lid 26 is mounted to be movable in a diametrical direction of the holder 24.

Since these battery lids 26 and 27 are provided for covering the cuts 23a and 24a, they do not have a function to hold the batteries 21 and 22. In other words, whilst the battery lids 26 and 27 cover part of the batteries 21 and 22 stored in the holder 23 and 24, they are not in contact with the batteries 21 and 22.

A near rectangular switch plate 28 for restricting movements of the first battery lid 26 and second lid 27 is mounted to be movable on the above-mentioned tangent line against the chassis 25. Disposed at the center of the switch plate 28 is a knob 28a which is to be held by the hand when moving the switch plate 28.

The switch plate 28 has a first raised section 28b for preventing a movement of the first lid 26, and a second raised section 28c for preventing a movement of the second lid 27. When the knob 28a is in a position substantially aligned with a first mark 29a indicating the removal protect position (standby position), edges of the first lid 26 and second lid 27 come into contact with the first raised section 28b and second raised section 28c, respectively, to prevent the movements of the first lid 26 and second lid 27.

When the knob 28a is moved to a position substantially aligned with a second mark 29b indicating a position where a removal of the battery 21 is available, the first raised section 28b comes to a position where it is unable to prevent a movement of the first lid 26 and the second raised section 28c comes to a position where it is able to prevent a movement of the second lid 27.

When the knob 28a is moved to a position substantially aligned with a third mark 29c indicating a position where a removal of the battery 22 is available, the second raised section 28c comes to a position where it is unable to prevent a movement of the second lid 27 and the first raised section 28b come to a position where it is able to prevent a movement of the first lid 26.

Mounted on a back surface of the chassis 25 is a substantially U-shaped first rib 30 which controls a movement of the switch plate 28 by detecting whether the battery 21 is stored in the holder 23. As illustrated in FIG. 8, the first rib 30 is pushed toward the front surface of the chassis 25 by a coil spring 30a.

The chassis 25 has a through-hole 25a. A detection end 30b as one of the ends of the first rib 30 passes through-hole 25a and is inserted into the holder 23 from the back surface of the chassis 25.

The chassis 25 also has a through-hole 25b. A lock end 30c as the other end of the first rib 30 passes through the through-hole 25b and comes into contact with the back surface of the switch plate 28.

Moreover, a substantially U-shaped second rib 31 is mounted on the back surface of the chassis 25 like the first rib 30. The second rib 31 controls a movement of the switch plate 28 by detecting whether the battery 22 is stored in the holder 24.

A first lock hole 32 is formed in the back surface of the switch plate 28 so that the lock end 30c of the first rib 30 fits into the first lock hole 32 when the switch plate 28 is moved to a position where the knob 28a is in a position substantially aligned with the second mark 29b.

When the battery 21 is removed form the holder 23 after moving the switch plate 28 to the position where the knob 28a is in the position substantially aligned with the second mark 29b, the first rib 30 which has been pushed down by the battery 21 is moved toward the front surface of the chassis 25 by the coil spring 30a. Therefore, the lock end 30c fits into the first lock hole 32 and prevents a movement of the switch plate 28.

Furthermore, a second lock hole 33 is formed in the back surface of the switch plate 28 so that the lock end 31c of the second rib 31 fits into the second lock hole 33 when the switch plate 28 is moved to a position where the knob 28a is substantially aligned with the third mark 29c. At this time, when the battery 22 is removed from the holder 24, the lock end 31c fits into the second lock hole 33 and prevents a movement of the switch plate 28.

The following description discusses an operation of the battery storage mechanism. When the electronic device is operated normally, the cuts 23a and 24a are covered with the first lid 26 and second led 27. Therefore, the removal of the first and second batteries 26 and 27 becomes unavailable.

At this time, the knob 28a of the switch plate 28 is substantially aligned with the first mark 29a, and the first raised section 28b and second raised section 28c of the switch plate 28 are in the position to prevent the movements of the first lid 26 and second lid 27.

Next, for example, replacing the battery 21 is discussed below. As illustrated in FIGS. 9 and 10, when the knob 28a is moved to the position where it is substantially aligned with the second mark 29b, i.e., replacement position of the battery 21, the first raised section 28b of the switch plate 28 comes to the position where it is unable to prevent a movement of the first lid 26. At this time, the second raised section 28c of the switch plate 28 comes to a position where it is able to prevent a movement of the second lid 27.

After opening the first lid 26 to expose the cut 23a, for example, a stick-like jig is inserted into the cut 23a to remove the battery 21 from the holder 23. Then, the detection end 30b of the first rib 30 comes out of contact with the battery 21, and the first rib 30 is moved toward the front surface of the chassis 25 by the coil spring 30a.

As a result, the lock end 30c fits into the first lock hole 32 and prevents a movement of the switch plate 28. When a new battery 21 is stored in the holder 23, the detection end 30b is pushed by the battery 21 and the first rib 30 is moved toward the back surface of the chassis 25 against the pushing force of the coil spring 30a. Consequently, the lock end 30c and the first lock hole 32 come out of contact with each other.

Finally, the first lid 26 is moved to cover the cut 23a and the switch plate 28 is moved back to the initial position to complete the replacement of the battery 21. The battery 22 is also replaced in the same manner.

With this structure, however, replacing the battery 21 for example requires a complicated process, i.e., three steps of actions: moving the switch plate 28 to the replacement position; moving the first lid 26; and removing the battery 21. In addition, since the mechanism is complicated, the manufacturing cost is increased and the rate of defective products is hard to be decreased.

SUMMARY OF THE INVENTION

It is an object of the present invention to provide a battery storage mechanism with a simplified structure, that is capable of preventing a plurality of batteries from being simultaneously removed by mistake and achieves easier replacement of a battery.

In order to achieve the above object, a battery storage mechanism of the present invention includes:

a plurality of battery storage sections, arranged in a main body of an electronic device, for holding batteries;

a plurality of cut sections, formed attached to the battery storage sections, for assisting a removal of the battery from the battery storage section;

a switch member which is movable in the vicinity of the battery storage sections, covers at least one of the cut sections when moved within a moving range, and uncovers a desired cut section by changing a position where the switch member stops; and lock means included in each of the battery storage sections, wherein the lock means locks the switch member when the battery storage section does not store a battery, and wherein, when the battery storage section stores a battery, the battery comes into contact with the lock means and changes the position of the lock means to unlock the switch member.

With this structure, a desired cut section among the cut sections is uncovered by changing a position where the switch member stops. When replacing one of the batteries stored in the battery storage sections, the switch member is first moved to uncover the cut section corresponding to the battery. When the battery is removed from the battery storage section, the lock means of the battery storage section and the battery come out of contact with each other and the lock means is moved to lock the switch member. Thus, the removal of other batteries corresponding to the cut sections covered with the switch member from the battery storage sections becomes unavailable.

When a new battery is stored in the battery storage section, it comes into contact with the lock means. As a result, the lock means is moved and unlocks the switch member, permitting the removal of other batteries.

As described above, when one of the batteries is removed, the switch member is locked and the removal of other batteries becomes unavailable. It is therefore possible to prevent stored data from being lost due to a suspension of power supply by using the battery storage mechanism in an electronic device having a memory function.

Moreover, the battery storage mechanism has a simplified structure as it does not require a battery lid which is an essential component in a conventional structure. Consequently, the manufacturing cost is reduced and the rate of defective products becomes lower. Furthermore, since there is no need to handle the battery lid, replacing batteries becomes easier.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a plan view illustrating essential components of a battery storage mechanism of the present invention.

FIG. 2 is a cross-section of FIG. 1 cut across the I—I line.

FIG. 3 is a plan view illustrating the battery storage mechanism with a cut uncovered.

FIG. 4 is a cross-section of FIG. 3 cut across the II—II line.

FIG. 7 is a plan view illustrating essential components of a conventional battery storage mechanism.

FIG. 8 is a cross-section of FIG. 7 cut across the III—III line.

FIG. 9 is a plan view illustrating the battery storage mechanism with a cut uncovered.

FIG. 10 is a cross-section of FIG. 9 cut across the IV—IV line.

DESCRIPTION OF THE PREFERRED EMBODIMENTS

Figure 1:
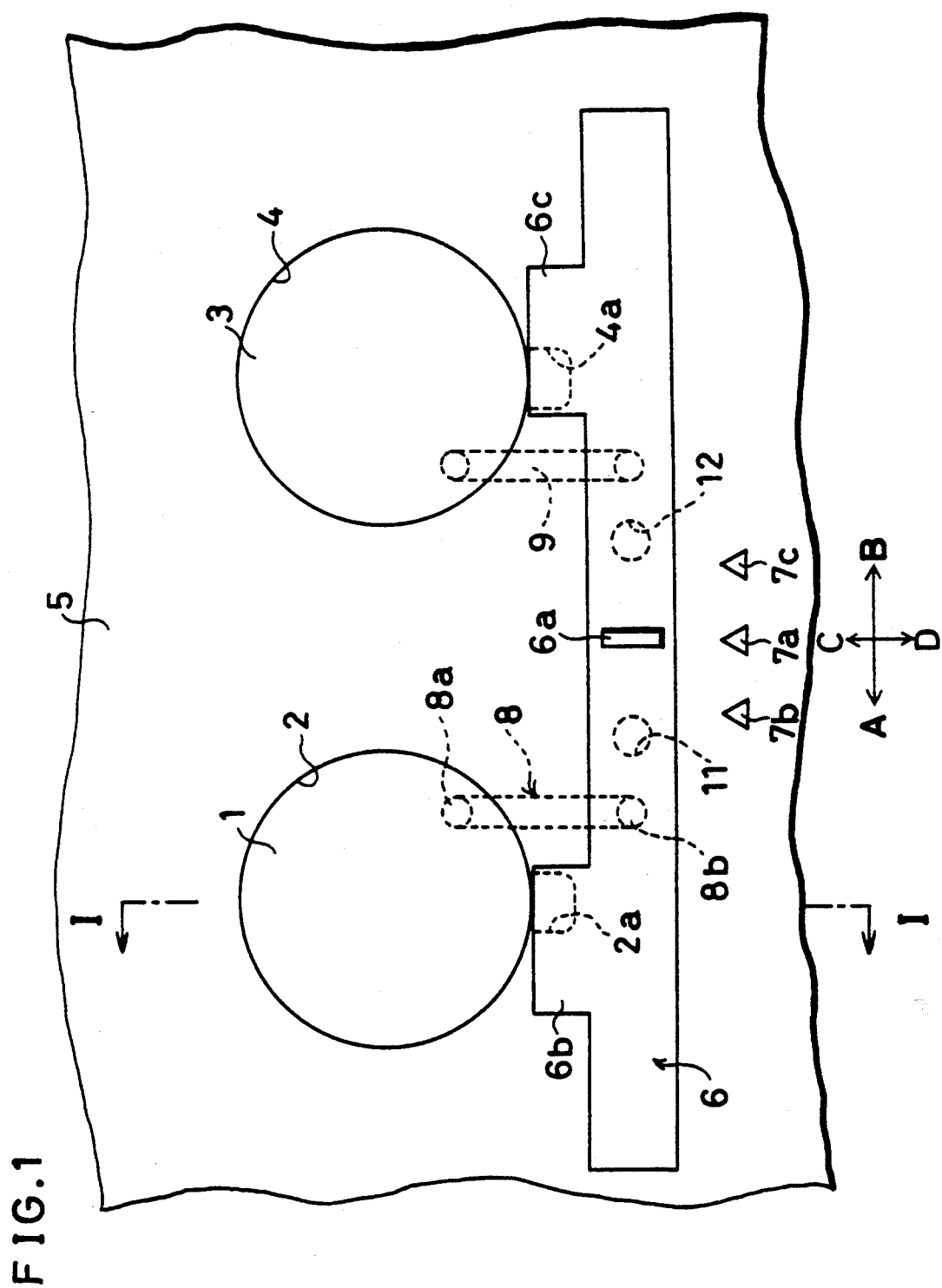
FIGS. 1 to 4 illustrate one embodiment of the present invention.

The following description discusses a first embodiment of the present invention with reference to FIGS. 1 to 4.

A battery storage mechanism of the present embodiment is used in an electronic device having a memory function, and includes holders 2 and 4 (battery storage sections) having a substantially circular cross-section, disposed adjacent to each other on a chassis 5 (the main body) of the electronic device. A disk-shaped or button-shaped battery 1 is stored in the holder 2, while a disk-shaped or button-shaped battery 3 is stored in the holder 4. For example, lithium batteries are used as the batteries 1 and 3.

The batteries 1 and 3 are held in the holders 2 and 4 by pushing sides of the batteries 1 and 3 toward the center of the holders 2 and 4 with holding means such as a flat spring, not shown.

Electrodes, not shown, are arranged on the holding means and the bottom surface of each of the holders 2 and 4. When the batteries 1 and 3 are held in the holders 2 and 4, power is supplied from the batteries 1 and 3 to the electronic device.

The chassis 5 has cuts 2a and 4a (cut sections) to assist the removal of the batteries 1 and 2 from the holders 2 and 4. The cuts 2a and 4a are formed on a tangent line touching edges of the holders 2 and 4.

A near rectangular switch plate 6 (a switch member) for covering and uncovering the cuts 2a and 4a is mounted on the chassis 5. The switch plate 6 is reciprocative on a straight line substantially parallel with the tangent line of the holder 2 and 4 near the holders 2 and 4.

Disposed at the center of the switch plate 6 is a near rectangular parallelepiped knob 6a which is to be held by the hand when moving the switch plate 6 along the tangent line.

In order to simplify the handling of the switch plate 6, a triangular first mark 7a, a second mark 7b and a third mark 7c, indicating positions where the knob 6a is to be stopped, are made along a moving direction (the A-B direction) of the switch plate 6. The first mark 7a indicates a removal protect position where removing the batteries 1 and 3 are not permitted. The second mark 7b on the left side of the first mark 7a indicates a replacement position of the battery 1. The third mark 7c on the right side of the first mark 7a indicates a replacement position of the battery 3.

The switch plate 6 includes a substantially rectangular first cover plate 6b for covering the cut 2a, and a substantially rectangular second cover plate 6b for covering the cut 4a. When the knob 6a is aligned with the first mark 7a, the cut 2a is covered with the right portion of the first cover plate 6b, while the cut 4a is covered with the left portion of the second cover plate 6c. Consequently, the removal of each of the batteries 1 and 3 is not allowed.

Figure 3:
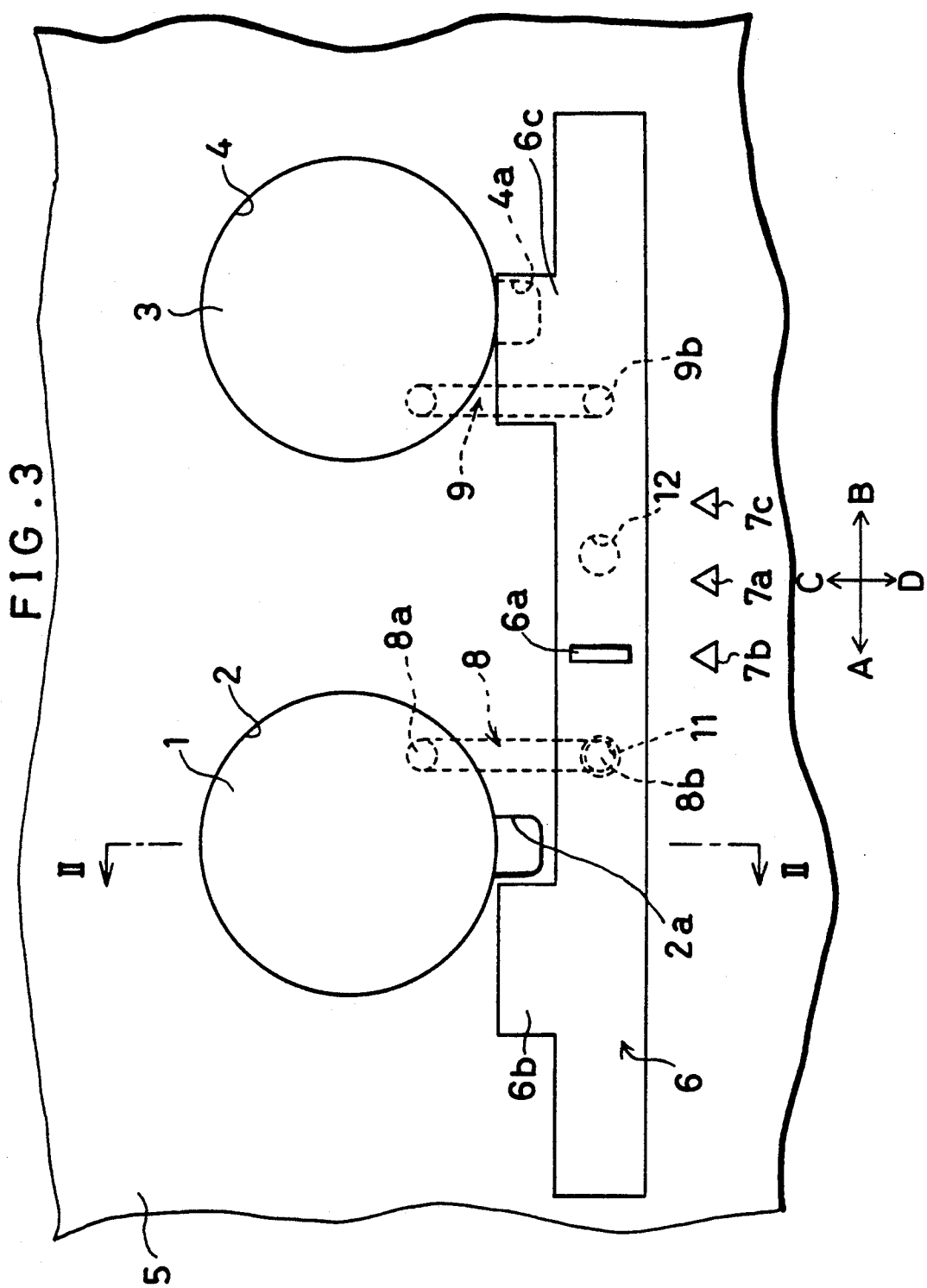

As illustrated in FIG. 3, when the knob 6a of the switch plate 6 is moved to a position aligned with the second mark 7b, the cut 2a is uncovered, while the cut 4a remains covered with the second cover plate 6c.

On the contrary, when the knob 6a is moved to a position aligned with the third mark 7c, not shown, the cut 4a is uncovered, while the cut 2a remains covered with the first cover plate 6b.

As described above, the switch plate 6 is movable between the removal protect position and the removal permit position. When the switch plate 6 is in the removal protect position, it covers part of the holder 2 and the cut 2a. When the switch plate 6 is in the removal permit position, the cut 2a is uncovered so that a finger or a stick-like jig is inserted into the cut 2a to remove the battery 1. The switch plate 6 is also movable between the removal protect position and the removal permit position to cover or uncover the cut 4a.

Additionally, the switch plate 6 is arranged so that the knob 6a can not be moved in the A direction from the second mark 7b and in the B direction from the third mark 7c. With this arrangement, it is possible to simultaneously cover the cuts 2a and 4a, but impossible to uncover both the cuts 2a and 4a at a time.

Figure 5:
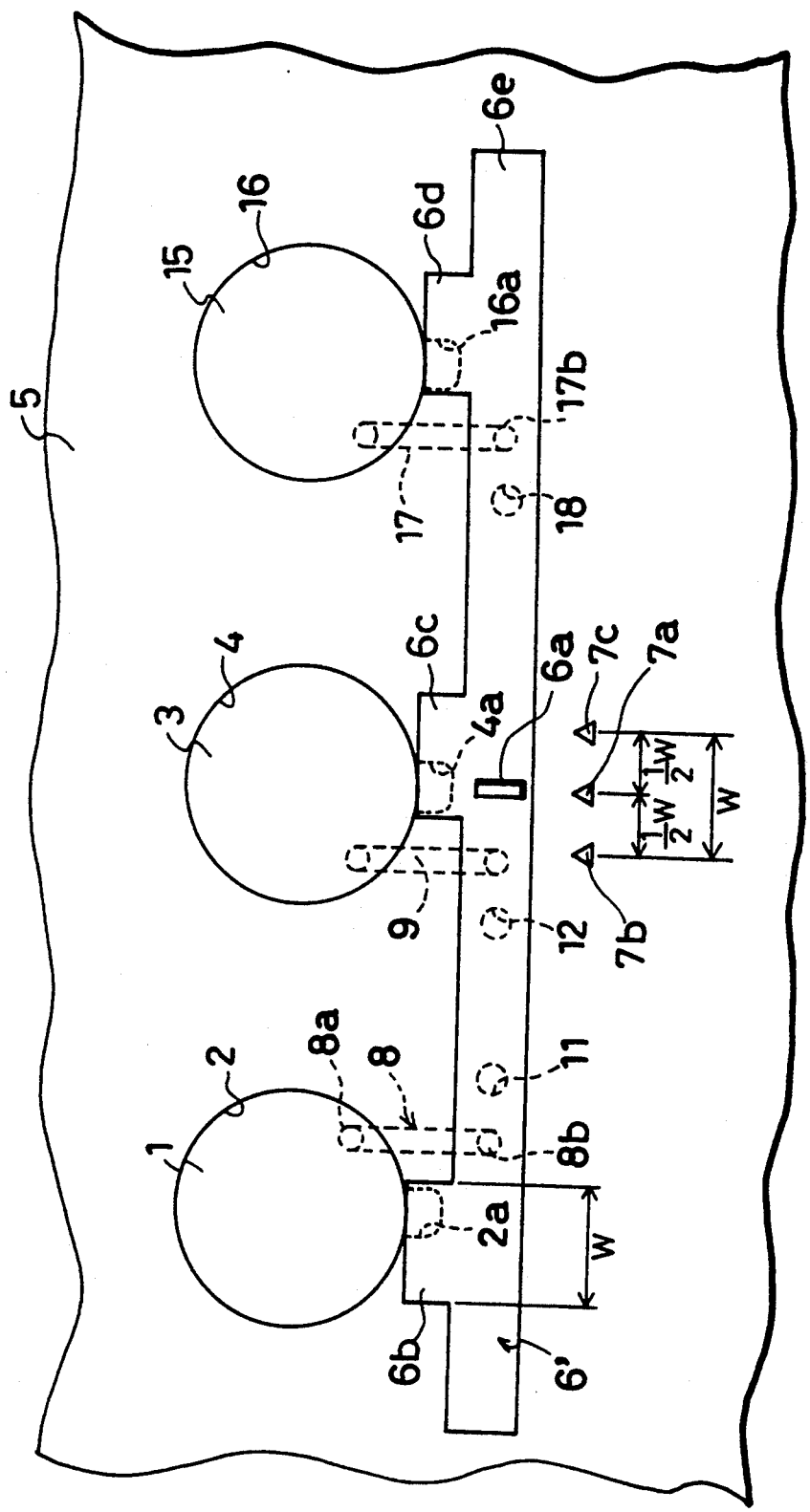
FIG. 5 is a plan view illustrating essential components of a battery storage mechanism according to another embodiment of the present invention.

Furthermore, a near U-shaped first rib 8 (lock means) for controlling a movement of the switch plate 6 by detecting whether the battery 1 is stored in the holder 2 is mounted on the back surface of the chassis 5. As illustrated in FIG. 5, the first rib 8 is pushed (in the holder 2) toward the front surface of the chassis 5 by a coil spring 10 (pushing means).

Figure 2:
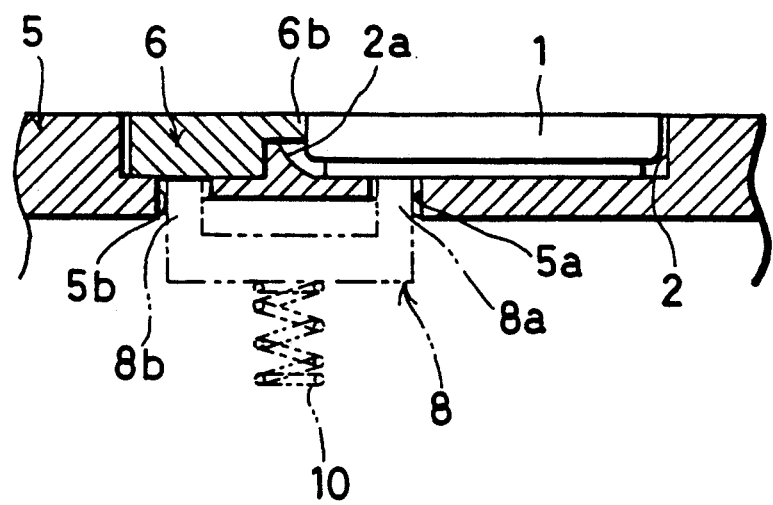

As illustrated in FIG. 2, the chassis 5 has a through-hole 5a. A detection end 8a as one of the ends of the first rib 8 passes through the through-hole 5a and is inserted into the holder 2 from the back surface of the chassis 5.

The chassis 5 also has a through-hole 5b. A lock end 8b as the other end of the first rib 8 passes through the through-hole 5b and comes into contact with the back surface of the switch plate 6.

Moreover, a substantially U-shaped second rib 9 (lock means) is mounted on the back surface of the chassis 5 like the first rib 8. The second rib 9 controls a movement of the switch plate 6 by detecting whether the battery 3 is stored in the holder 4.

A first lock hole 11 is formed on a location of the back surface of the switch plate 6 facing the lock end 8b so that the lock end 8b fits into the first lock hole 11 when the switch plate 6 is moved to a position where the knob 6a is substantially aligned with the second mark 7b.

When the battery 21 is removed from the holder 2 after moving the switch plate 6 to the position where the knob 6a is substantially aligned with the second mark 7b, the first rib 8 which has been pushed down by the battery 1 is moved to the front surface of the chassis 5 by the coil spring 10. This causes the lock end 8b to fit into the first lock hole 11, thereby preventing a movement of the switch plate 6.

Furthermore, a second lock hole 12 is formed in a location of the back surface of the switch plate 6 facing the lock end 8b so that the lock end 8b fits into the second lock hole 12 when the switch plate 6 is moved to a position where the knob 6a is substantially aligned with the third mark 7c.

At this time, if the battery 3 is removed from the holder 4, the lock end 9b fits into the second lock hole 12 and prevents a movement of the switch plate 6.

Next, the operation of the battery storage mechanism is discussed below. When the electronic device is operated normally, the knob 6a in substantially aligned with the first mark 7a, and the cuts 2a and 4a are covered with the first cover plate 6b and second cover plate 6c.

Therefore, a removal of each of the first and second batteries 1 and 3 is not permitted.

Figure 4:
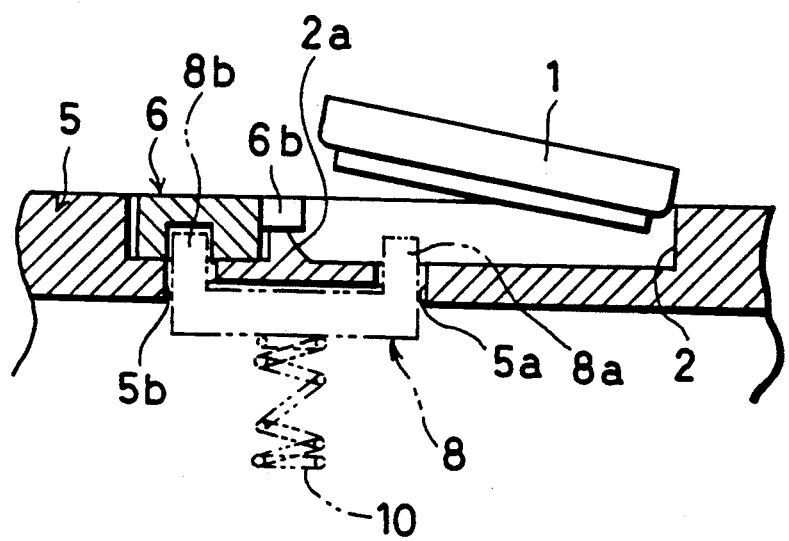

The following description discusses replacing the battery 1, for example. As illustrated in FIGS. 3 and 4, when the knob 6a is moved to the position substantially corresponding to the second mark 7b, i.e., replacement position of the battery 1, the cut 4a is covered with the second cover plate 6c, while the cut 2a is uncovered.

When removing the battery 1 from the holder 2 by inserting, for example, a stick-like jig into the cut 2a, the lock end 8b of the first rib 8 faces the first lock hole 11 and the detection end 8a of the first rib 8 comes out of contact with the bottom surface of the battery 1. As a result, the first rib 8 is moved toward the front surface of the chassis 5 by the pushing force of the coil spring 10.

Therefore, the lock end 8b fits into the first lock hole 11 and prevents a movement of the switch plate 6. When a new battery 1 is stored in the holder 2, the detection end 8a is pushed by the battery 1 and the first rib 8 is moved toward the back surface of the chassis 5 against the pushing force of the coil spring 10. Consequently, the lock end 8b and the first lock hole 11 come out of contact with each other.

Then, the switch plate 6 which becomes movable in the B direction is moved back to the initial position (where the knob 6a is aligned with the first mark 7a) to complete the replacement of the battery 1. Replacing the battery 3 is also carried out in the same manner.

Namely, with the battery storage mechanism, replacing the battery 3 can not be performed unless the battery 1 is stored in the holder 2. Similarly, replacing the battery 1 can not be performed unless the battery 3 is stored in the holder 4.

For example, if the battery 1 is used to supply power to an electronic device to perform operations and if the battery 3 is used to save data stored, the above-mentioned battery storage mechanism is capable of preventing data stored in a memory from being lost by mistake. Because, this mechanism prevents the user from mistakenly removing the batteries 1 and 3 at a time when replacing one of the batteries 1 and 3, and prevents s suspension of the supply of power to memory such as SRAM (Static Random Access Memory).

With this structure, there is no need to provide a battery lid which is an essential component in a conventional structure. The above-mentioned simplified structure enables a reduction in the manufacturing cost and a lowering of the rate defective products. Furthermore, since no battery lid is included, a conventional complicated battery replacement process is simplified.

Additionally, the function of a conventional battery lid is to cover a cut. Although the battery lid covers part of the battery stored, it does not come into contact with the battery. Namely, the conventional battery lid does not have a function to hold a battery. Therefore, even if a battery lid is omitted from the structure of the present invention, the battery storage mechanism with such a simplified structure has a function similar to that of the conventional structure in terms of storing a battery.

The battery storage mechanism of the present invention may also be arranged to store three batteries. The following description discusses a battery storage mechanism including three holders 2, 4 and 16, for storing the batteries 1, 3 and 15 with reference to FIGS. 5 and 6. The members having the same structure and function as in the above-mentioned embodiment will be designated by the same code and their description will be omitted.

The battery storage mechanism shown in FIG. 5 includes a switch plate 6' for switching a position among a position where the removal of any of the batteries 1, 3 and 15 is not permitted, a position where the removal of the batteries 3 and 15 is not permitted but the replacement of the battery 1 is permitted, and a position where the removal of the battery 1 is not permitted but the replacement of the barbarities 3 and 15 is permitted.

The switch plate 6' includes a plate-like main body 6e which is movable along the cuts 2a, 4a, and 16a provided for assisting the removal of the batteries 1, 3 and 15. The main body 6e has a manually operated knob 6a, the first cover plate 6b, second cover plate 6c and third cover plate 6d for covering the cuts 2a, 4a and 16a, respectively. The area of each of the first cover plate 6b, second cover plate 6c and third cover plate 6d is slightly larger than the twice of the area of each of the cuts 2a, 4a and 16a.

The moving range of the switch plate 6' is restricted by the width of the first cover plate 6b, second cover plate 6c and third cover plate 6d. A first mark 7a, second mark 7b and third mark 7c are formed on the chassis 5 at an interval equivalent to a half of the width.

A near U-shaped third rib 17 for controlling a movement of the switch plate 6' by detecting whether the battery 15 is stored in the holder 16 is mounted on the back surface of the chassis 5 like the first and the second ribs 8 and 9. Like the first and second lock holes 11 and 12, a third lock hole 18 is mounted on the back surface of the chassis 5. The third lock hole 18 has a shape which allows a lock end 17b to be freely inserted into or removed from the third lock hole 18.

When the knob 6a is moved to be aligned with the first mark 7a located at the center, the cuts 2a, 4a and 16a are covered with the first cover plate 6b, second cover plate 6c and third cover plate 6d, respectively, to prohibit the removal of the batteries 1, 3 and 15. At this time, the cut 2a is covered with a right portion of the first cover plate 6b, while the cuts 4a and 16a are covered with a left portion of the second cover plate 6c and of the third cover plate 6d.

When the knob 6a is moved toward left to be aligned with the second mark 7b located on the left side of the first mark 7a, only the cut 2a is uncovered, permitting only the replacement of the battery 1. When the knob 6a is moved toward right to be aligned with the third mark 7c located on the right side of the first mark 7a, the cuts 4a and 16a are uncovered simultaneously to allow the replacement of the batteries 3 and 15.

Figure 6:
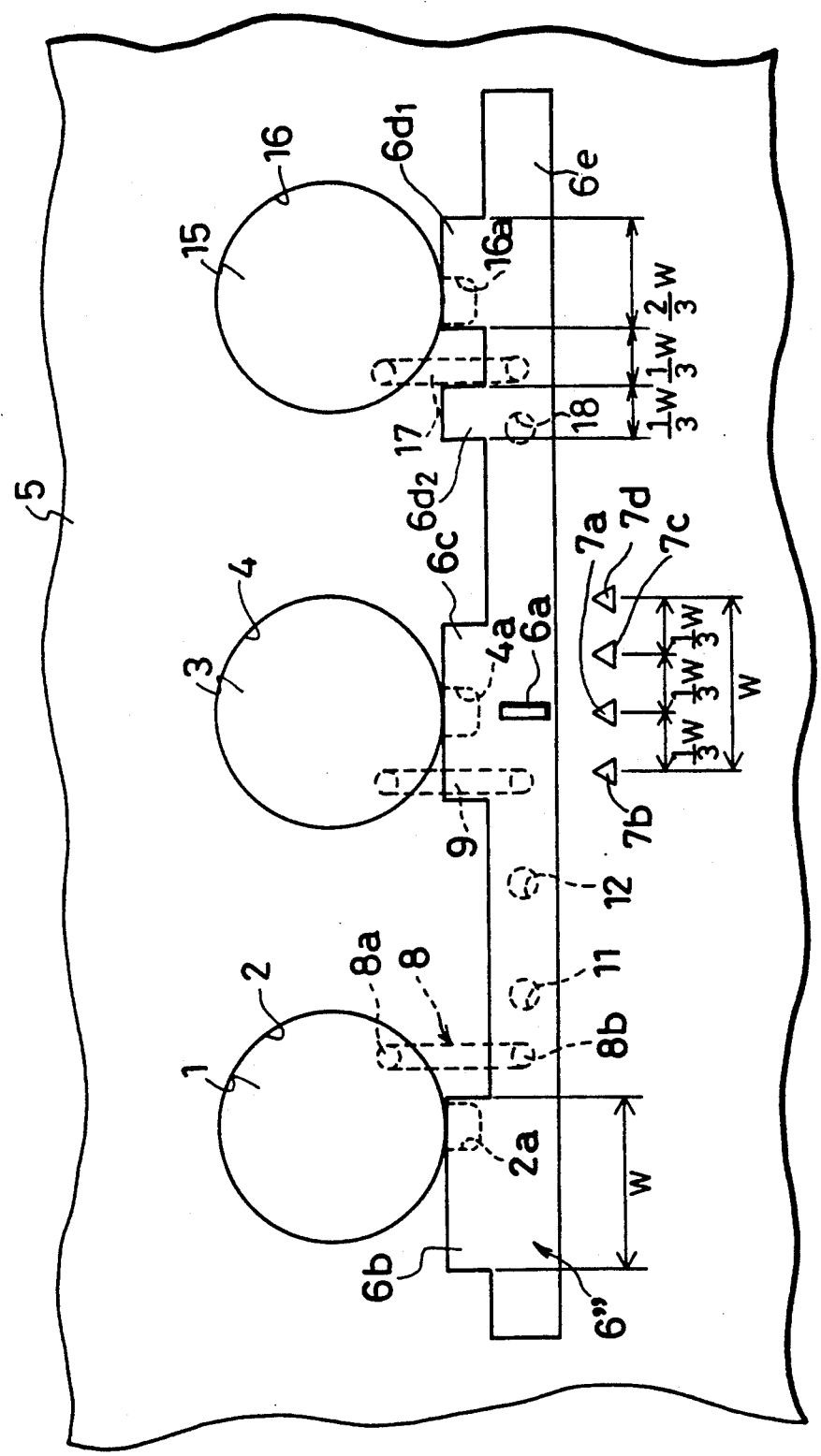
FIG. 6 is a plan view illustrating essential components of a battery storage mechanism according to still another embodiment of the present invention.
Figure 7:
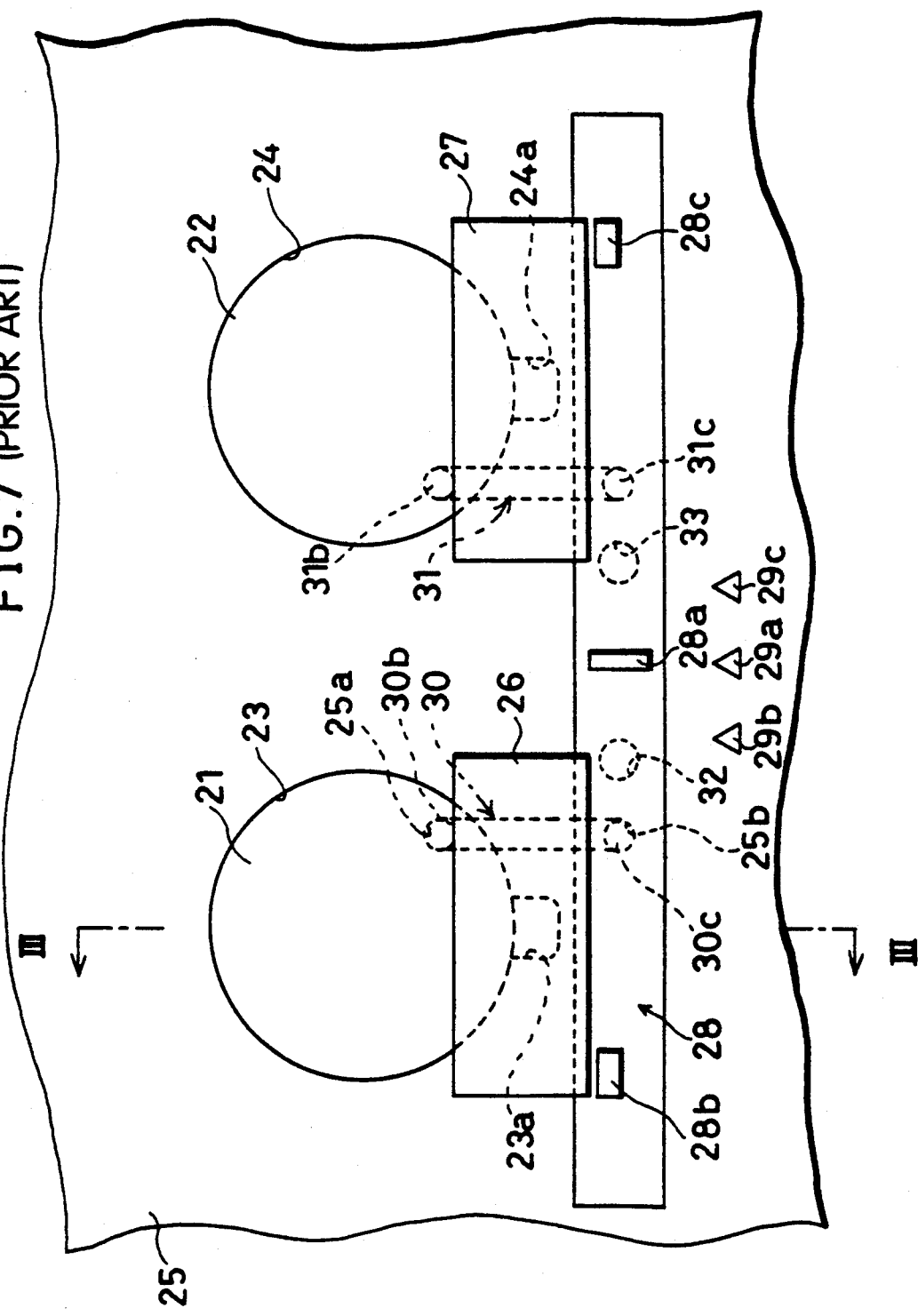
FIGS. 7 to 10 illustrate a conventional example.
Figure 8:
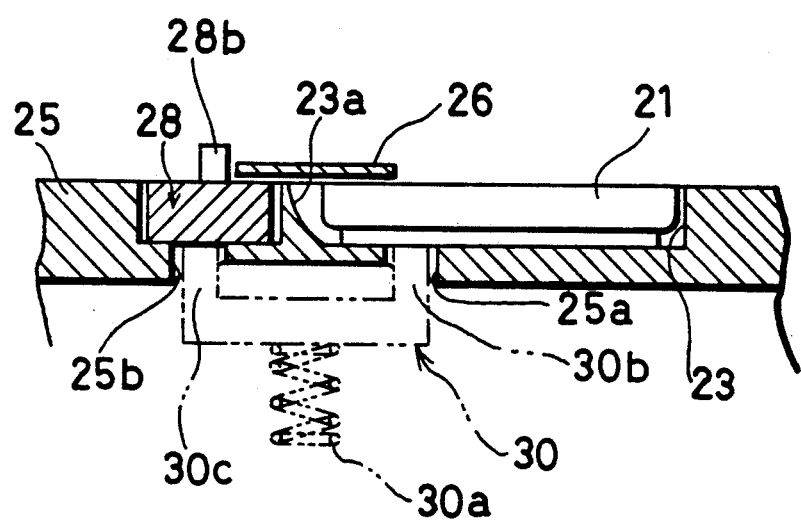
Figure 9:
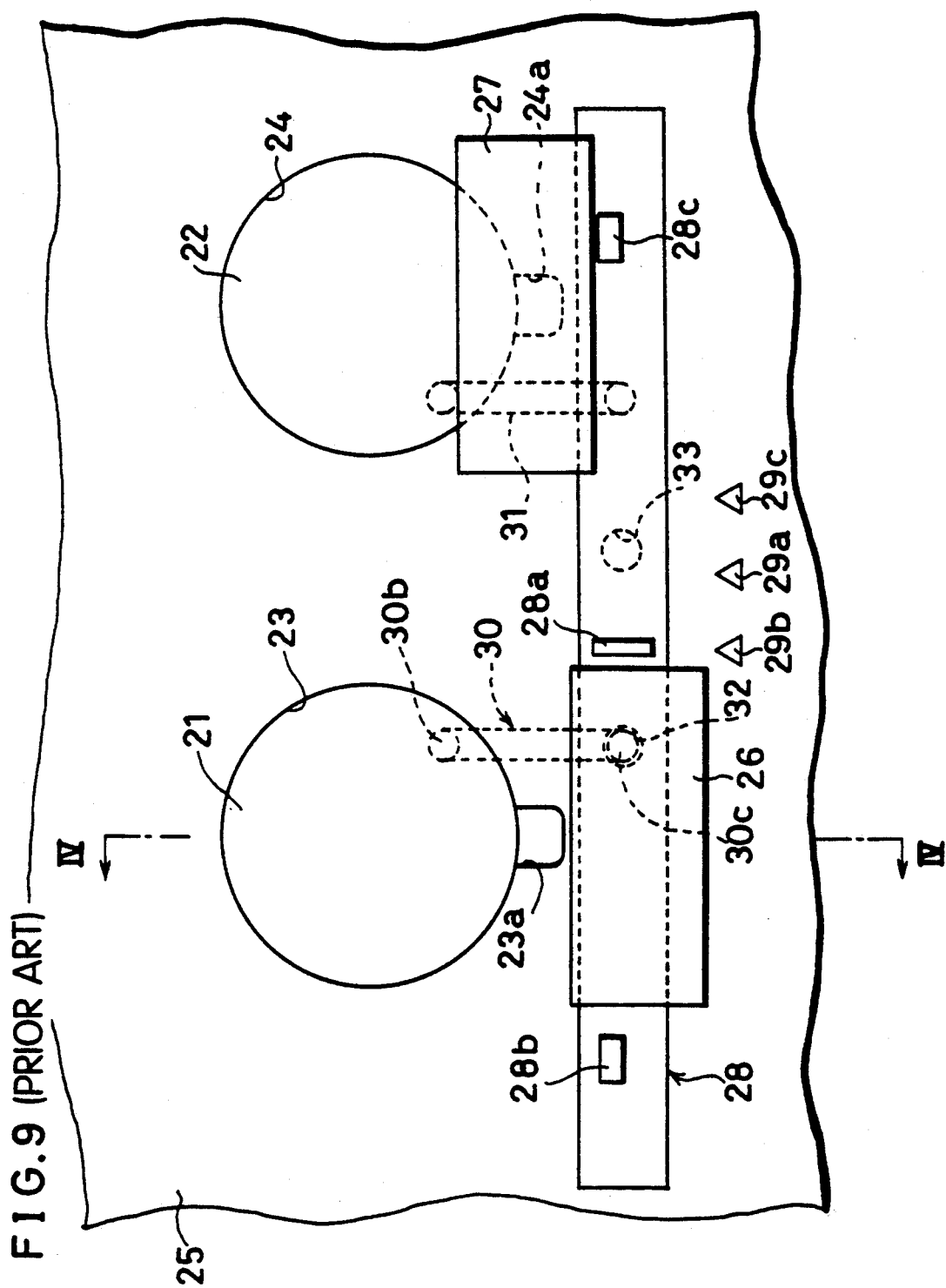
Figure 10:
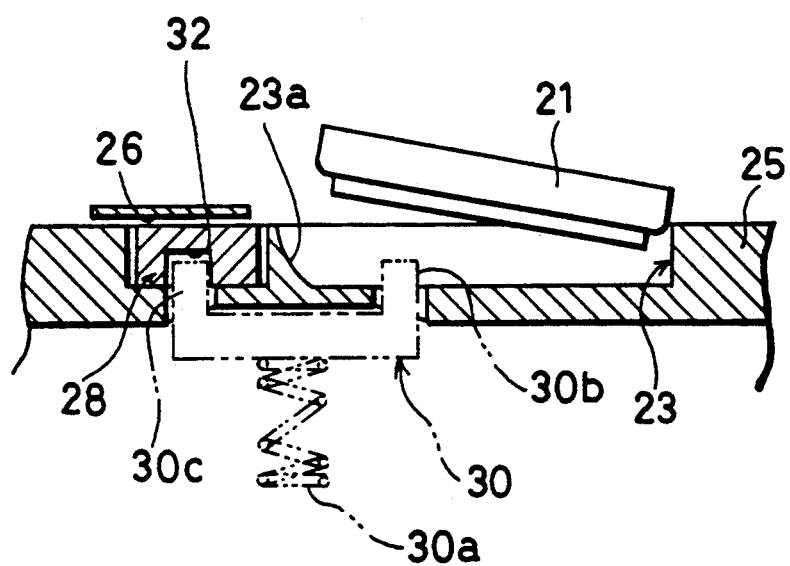

The battery storage mechanism shown in FIG. 6 includes a switch plate 6" for switching a position among a position where the removal of any of the batteries 1, 3 and 15 is not permitted, a position where the removal of the batteries 3 and 15 is not permitted and only the replacement of the battery 1 is available, a position where the removal of the batteries 1 and 15 is not permitted and only the replacement of the battery 3 is available, and a position where the removal of the batteries 1 and 3 is not permitted and only the replacement of the battery 15 is available.

The switch plate 6" includes the first cover plate 6b, second cover plate 6c, and third cover plates $6d_1$ and $6d_2$ for covering the cuts 2a, 4a and 16a, respectively. The area of each of the first cover plate 6b and second cover plate 6c is slightly larger than the three times of the area of each of the cuts 2a, 4a and 16a. The area of the third cover plate 6$d_1$ is slightly larger than the twice the area of each of the cuts 2a, 4a and 16a. The area of the third cover plate 6$d_2$ is slightly larger than the area of each of the cuts 2a, 4a and 16a. The third cover plate 6$d_1$ is separated from the third cover plate 6$d_2$ by a distance slightly greater than the width of each of the cuts 2a, 4a and 16a.

The moving range of the switch plate 6" is restricted by the width of the first cover plate 6b and the second cover plate 6c. The first mark 7a, second mark 7b, third mark 7c and fourth mark 7d are formed on the chassis 5 at an interval equivalent to one third of the width.

When the knob 6a is moved to be aligned with the first mark 7a, i.e., the second mark from the left, the cuts 2a, 4a and 16a are covered with the first cover plate 6b, second cover plate 6c and third cover plate 6$d_1$, respectively, to prohibit the removal of any of the batteries 1, 3 and 15. At this time, the cut 2a is covered with a right portion of the first cover plate 6b, the cut 4a is covered with a central portion of the second cover plate 6c, and the cut 16a is covered with a left portion of the third cover plate 6$d_1$.

When the knob 6a is moved to be aligned with the second mark 7b located at the left end, only the cut 2a is uncovered so that only a replacement of the battery 1 is available. When the knob 6a is moved to be aligned with the third mark 7c, i.e., the third mark from the left, only the cut 16a is uncovered to allow the replacement of the battery 15. When the knob 6a is moved to be aligned with the fourth mark 7d located at the right end, only the cut 4a is uncovered to allow the replacement of the battery 3.

Similarly, the movement of the switch plate 6" is prevented by the ribs 8, 9 and 17 at each of the battery replacing positions.

It is also possible to achieve a battery storage mechanism capable of storing more than three batteries.

It is desirable to adopt the battery storage mechanism of this structure in a portable information tool such as a pocket-size computer.

As described above, a battery storage mechanism for an electronic device includes:

a plurality of battery storage sections, arranged in a main body of an electronic device, for holding batteries;

a plurality of cut sections, formed attached to the battery storage sections, for assisting a removal of the battery from the battery storage section;

a switch member which is movable in the vicinity of the battery storage sections, covers at least one of the cut sections when moved within a moving range, and uncovers a desired cut section by changing a position where the switch member stops; and lock means included in each of the battery storage sections, wherein the lock means locks the switch member when the battery storage section does not store a battery, and wherein, when the battery storage section stores a battery, the battery comes into contact with the lock means and changes the position of the lock means to unlock the switch member.

With this structure, when one of the batteries is removed from the battery storage section, the removal of other batteries becomes unavailable. It is therefore possible to prevent the user from removing more than a predetermined number of batteries at a time by mistake when replacing a battery. If this battery storage mechanism is used in an electronic device having a memory function, it is possible to prevent data in the memory from being lost by a suspension of power supply.

Moreover, this battery storage mechanism has a simplified structure as it does not require battery lids (26 and 27 in FIG. 29) which are essential components in a conventional structure, thereby reducing the manufacturing cost and the rate of defective products. Furthermore, since there is no need to handle the battery lids, the batteries are more easily replaced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery storage mechanism for an electronic device comprising:

a plurality of battery storage sections, arranged in a main body of said electronic device, for holding batteries;

a plurality of cut sections, formed attached to said battery storage sections, for assisting a removal of the battery from said battery storage section;

a switch member which is movable in the vicinity of said battery storage sections, covers at least one of said cut sections when moved within a moving range, and uncovers a desired cut section by changing a position where said switch member stops; and lock means included in each of said battery storage sections, wherein said lock means locks said switch member when said battery storage section does not store a battery, and wherein, when said battery storage section stores a battery, said battery comes into contact with said lock means and changes the position of said lock means to unlock said switch member.

2. The battery storage mechanism according to claim 1, wherein said cut sections are substantially aligned with each other, said switch member includes a plate-like main body movable along said cut sections, and a plurality of cover sections for covering said cut sections, said cover sections being mounted on said main body.

3. The battery storage mechanism according to claim 1, wherein said battery storage mechanism is installed in said main body of said electronic device, and further comprises a mark indicating a position where said switch member is to be stopped.

4. The battery storage mechanism according to claim 3, wherein said switch member includes a knob which is to be held by a hand when moving said switch member, and wherein said mark indicates a position where said knob is to be stopped.

5. The battery storage mechanism according to claim 1, wherein said lock means includes:

a battery detecting section which is movable into and out of said battery storing section;

a lock section for locking and unlocking said switch member by interlocking with said battery detecting section; and pushing means for pushing said battery detecting section toward inside of said battery storage section, wherein said lock section locks said switch member when said battery detection section is inserted into said battery storage section, and unlocks said switch member when a battery is stored in said battery storage section and said battery detection section is moved out of said battery storage section.

6. The battery storage mechanism according to claim 5, wherein said lock means includes a near U-shaped rib member which is pushed toward a front surface of said main body by said pushing means, said detecting section is one of the ends of said rib member, and said lock section is the other end of said rib member, and wherein said switch member includes a plurality of lock holes into and from which said lock section of each of said lock means is freely inserted and removed.

7. The battery storage mechanism according to claim 5, wherein said pushing means is a coil spring.

8. The battery storage mechanism according to claim 1, wherein said battery storage mechanism includes more than two battery storage sections.

9. The battery storage mechanism according to claim 1, wherein said electronic device has a memory function, and said battery storage sections store at least one battery for supplying power to operate said electronic device and at least one battery for retaining data in a memory.

10. The battery storage mechanism according to claim 9, wherein said electronic device is a pocket-size computer.

* * * * *